US011204057B2

(12) United States Patent
Shook

(10) Patent No.: US 11,204,057 B2
(45) Date of Patent: Dec. 21, 2021

(54) OPTIMIZED THREAD PROFILE FOR JOINING COMPOSITE MATERIALS

(71) Applicant: Dennis Sherlin, Hacienda Heights, CA (US)

(72) Inventor: Adam R Shook, City of Industry, CA (US)

(73) Assignee: Dennis Sherlin, Hacienda Heights, CA (US)

( * ) Notice: Subject to any disclaimer, the term of this patent is extended or adjusted under 35 U.S.C. 154(b) by 52 days.

(21) Appl. No.: 16/825,870

(22) Filed: Mar. 20, 2020

(65) Prior Publication Data

US 2021/0018033 A1 Jan. 21, 2021

Related U.S. Application Data

(60) Provisional application No. 62/874,517, filed on Jul. 16, 2019.

(51) Int. Cl.
*F16B 39/22* (2006.01)
*B29C 65/48* (2006.01)

(52) U.S. Cl.
CPC ............ *F16B 39/225* (2013.01); *B29C 65/48* (2013.01); *F16B 39/22* (2013.01)

(58) Field of Classification Search
CPC ...... F16B 11/006; F16B 25/00; F16B 33/002; F16B 39/00; F16B 39/22; F16B 39/225; B29C 65/48
USPC .................................. 411/82, 82.2, 411, 436
See application file for complete search history.

(56) References Cited

U.S. PATENT DOCUMENTS

| | | | | |
|---|---|---|---|---|
| 3,433,117 A | * | 3/1969 | Gowen, Jr. ............. | F16B 33/02 411/411 |
| 4,549,754 A | * | 10/1985 | Saunders ............... | E21B 17/042 285/334 |
| 4,842,466 A | * | 6/1989 | Wheeler .................. | F16B 33/02 411/366.3 |
| 4,861,210 A | * | 8/1989 | Frerejacques ........... | F16B 33/02 411/411 |
| 4,904,136 A | * | 2/1990 | Matsumoto ............ | F02M 3/062 411/82.2 |
| 5,624,219 A | * | 4/1997 | Hamanaka .............. | F16B 33/02 411/308 |

(Continued)

*Primary Examiner* — Roberta S Delisle
(74) *Attorney, Agent, or Firm* — Eugene Vamos

(57) ABSTRACT

An optimized thread profile (140) for joining composite materials is presented. This thread profile (140) maintains a certain material strength when used as part of a composite threaded joint (101). The thread profile (140) comprises a repeating pattern of four components: a crest region (150), a first flank (162), a root region (170) and a second flank (164). The thread profile (140) is symmetrical, that is, the dimensions of the four components do not change throughout the length of the thread profile. The crest (152) has a flat profile and the root (172) has a rounded profile. When a shaft (120) is affixed to a joining shaft (110) using this optimized thread profile (140), the flat profiles of the crest (152) of the shaft (120) and corresponding rounded profiles of the root (172) of the joining shaft (110) create a gap to accommodate a substance such as an adhesive or a lubricant. Similarly, the flat profiles of the crest (152) of the joining shaft (110) and corresponding rounded profiles of the root (172) of the shaft (120) create a gap to accommodate a substance.

8 Claims, 3 Drawing Sheets

(56) References Cited

U.S. PATENT DOCUMENTS

| | | | | |
|---|---|---|---|---|
| 5,672,037 | A * | 9/1997 | Iwata | F16B 39/30 |
| | | | | 411/311 |
| 5,876,168 | A * | 3/1999 | Iwata | F16B 39/30 |
| | | | | 411/308 |
| 5,944,465 | A * | 8/1999 | Janitzki | F16B 39/30 |
| | | | | 411/310 |
| 6,290,445 | B1 * | 9/2001 | Duran | F16B 5/0208 |
| | | | | 411/411 |
| 6,848,724 | B2 * | 2/2005 | Kessler | F16L 15/004 |
| | | | | 285/333 |
| 7,950,885 | B2 * | 5/2011 | Rosenkranz | F16B 33/004 |
| | | | | 411/82.2 |
| 10,145,496 | B2 * | 12/2018 | Li | F16L 15/06 |
| 10,767,683 | B2 * | 9/2020 | Kalantari | E21B 17/042 |
| 2006/0140739 | A1 * | 6/2006 | Komine | B23G 5/06 |
| | | | | 411/308 |
| 2006/0222475 | A1 * | 10/2006 | Breihan | E21B 17/042 |
| | | | | 411/411 |
| 2009/0116929 | A1 * | 5/2009 | Shea | F16B 39/30 |
| | | | | 411/311 |

* cited by examiner

US 11,204,057 B2

OPTIMIZED THREAD PROFILE FOR JOINING COMPOSITE MATERIALS

CROSS-REFERENCE TO RELATED APPLICATIONS

This application claims the priority benefit of U.S. Provisional Patent Application Ser. No. 62/874,517 filed Jul. 16, 2019, whose entire disclosure is expressly incorporated by reference in its entirety herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COM-PUTER PROGRAM

Not Applicable

STATEMENT REGARDING PRIOR DISCLOSURES BY AN INVENTOR OR JOINT INVENTOR

Not Applicable

BACKGROUND OF THE INVENTION

Field of Invention

The present invention generally relates to threaded joints made from composite materials.

Description of Related Art

Composite materials contain a fiber material bound together with a matrix, most often a polymer such resin or a plastic material. Fiber is used to add strength to the composite. Placing fiber in various directions allows the designer to increase, or decrease, strength in the desired direction, or plane.

Examples of fiber materials are glass, carbon, aramid, and boron. Further examples of matrix materials are ceramic, metal or carbon.

Polymer matrix material can be divided into three sub-types: thermoset, thermoplastic, and rubber.

Thermoset polymers are polymers that are cured into a solid form and cannot be returned to their original uncured form. Composites made with thermoset matrices are strong and have very good fatigue strength. The foremost types of thermoset polymers used in structural composites are benzoxazine resins, bis-Maleimide resins (BMI), cyanate ester resins, epoxy (epoxide) resins, phenolic (PF) resins, unsaturated polyester (UP) resins, polyimides, polyurethane (PUR) resins, silicones, and vinyl esters.

Thermoplastic polymers are polymers that can be molded, melted, and re-molded without altering its physical properties. Thermoplastic matrix composites are tougher and less brittle than thermosets, with very good impact resistance and dam-age tolerance. Examples of thermoplastic materials are polyethylene, polypropylene, polyvinyl chloride, polystyrene, polyamides, polyesters, and polyurethanes. High temperature thermoplastics include polyetherether ketones, liquid crystalline polymers, poly-sulfones, and polyphenylene sulfide.

In some cases, it is desirable to produce composite parts that will need to be joined to other parts, composite or otherwise—such as ceramics or metals. Addition-ally, it may be desirable to join and later de-join various composite parts, for example assembling and disassembling tubular pipes.

In the metal world this feature is accomplished with threads. In composites, creating threads by cutting the composite to the shape of a thread necessitates cutting the fibers that add strength to the composite. This thread cutting process weakens the composite material and produces a weak joint.

In some applications, like oil tool bridge, or frac, plugs, the threaded joint needs to be equally strong when the joint is stressed in either direction, tension or com-pression.

A thread profile in composite materials is needed that will maintain a certain amount of material strength when the thread profile is used as part of a threaded composite joint.

DETAILED DESCRIPTION OF THE INVENTION

Figure 1:
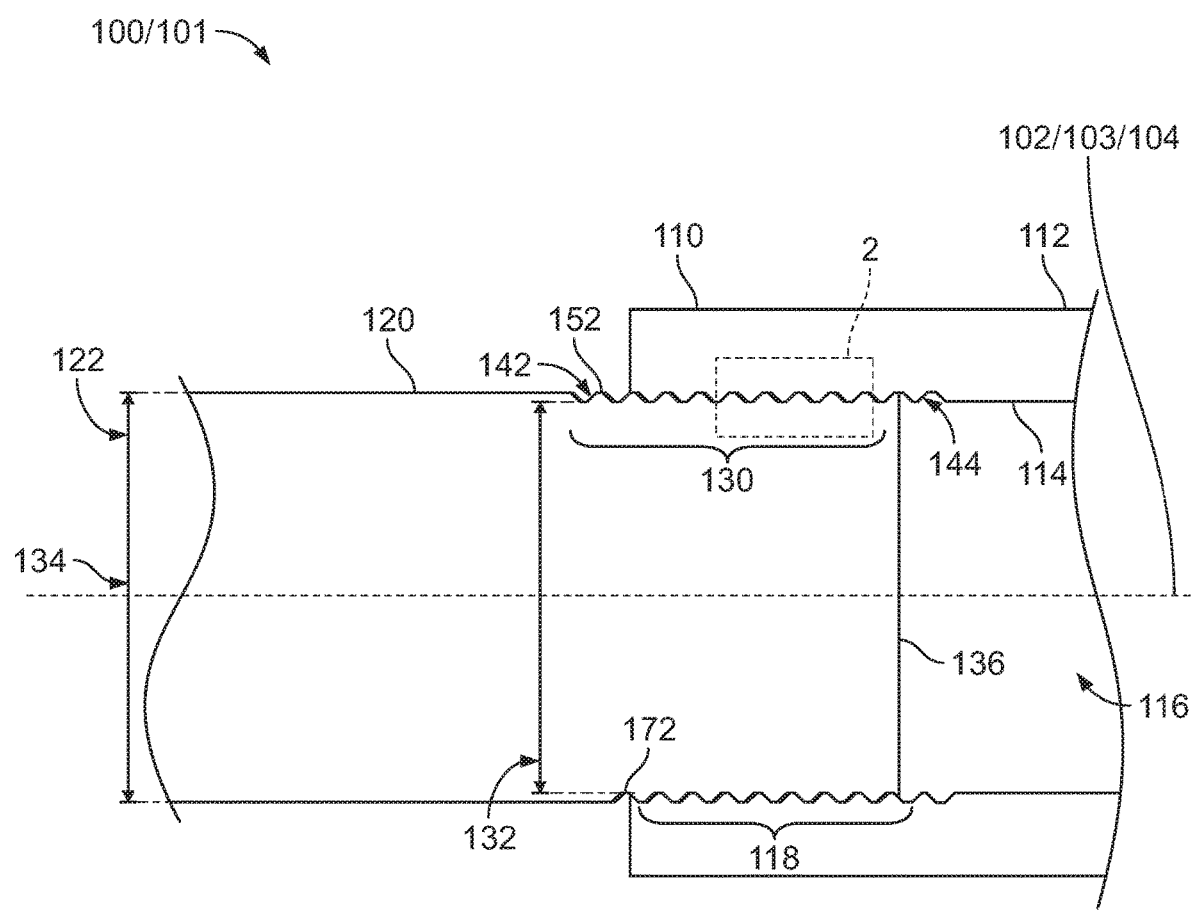
FIG. 1 shows a cross-section of a threaded joint (100). A shaft (120) is affixed to a joining shaft (110) by affixing the shaft (120) with a male thread (142) into the joining shaft (110) with a female thread (144).

A threaded joint (100) is comprised of a shaft (120) and a joining shaft (110). When the shaft (120) and the joining shaft (110) are made from composite materials, it is called a composite threaded joint (101). The shaft (120) is joined to the joining shaft (110) by affixing the shaft (120) with a male thread (142) into the joining shaft (110) with a female thread (144).

The shaft (120) has a threaded portion (130). At least one of the ends (136) of the threaded portion (130) has a flat profile, perpendicular to the central axis (102) of the shaft (120)(See FIG. 1).

The joining shaft (110) is a tubular sleeve comprising an exterior surface (112) and an interior surface (114), the interior surface (114) defining a sleeve bore (116). The interior surface (114) has a threaded portion (118). The sleeve bore (116) has a threaded portion (118), which is the mirror image of the threaded portion (118) of the interior surface (114).

The threaded portion (130) of the shaft (120) has a minor diameter (132) and a major diameter (134). The major diameter (134) of the threaded portion (130) is defined as the length between the crests (152) of the threaded portion (130) passing through perpendicularly to the central axis (102) of the shaft (120) (See FIG. 1). The minor diameter (132) of the threaded portion (130) of the shaft (120) is defined as the length between the roots (172) of the threaded portion (130) of the shaft (120) passing through perpendicularly to the central axis (102) of the shaft (120) (See FIG. 1)

Figure 2:
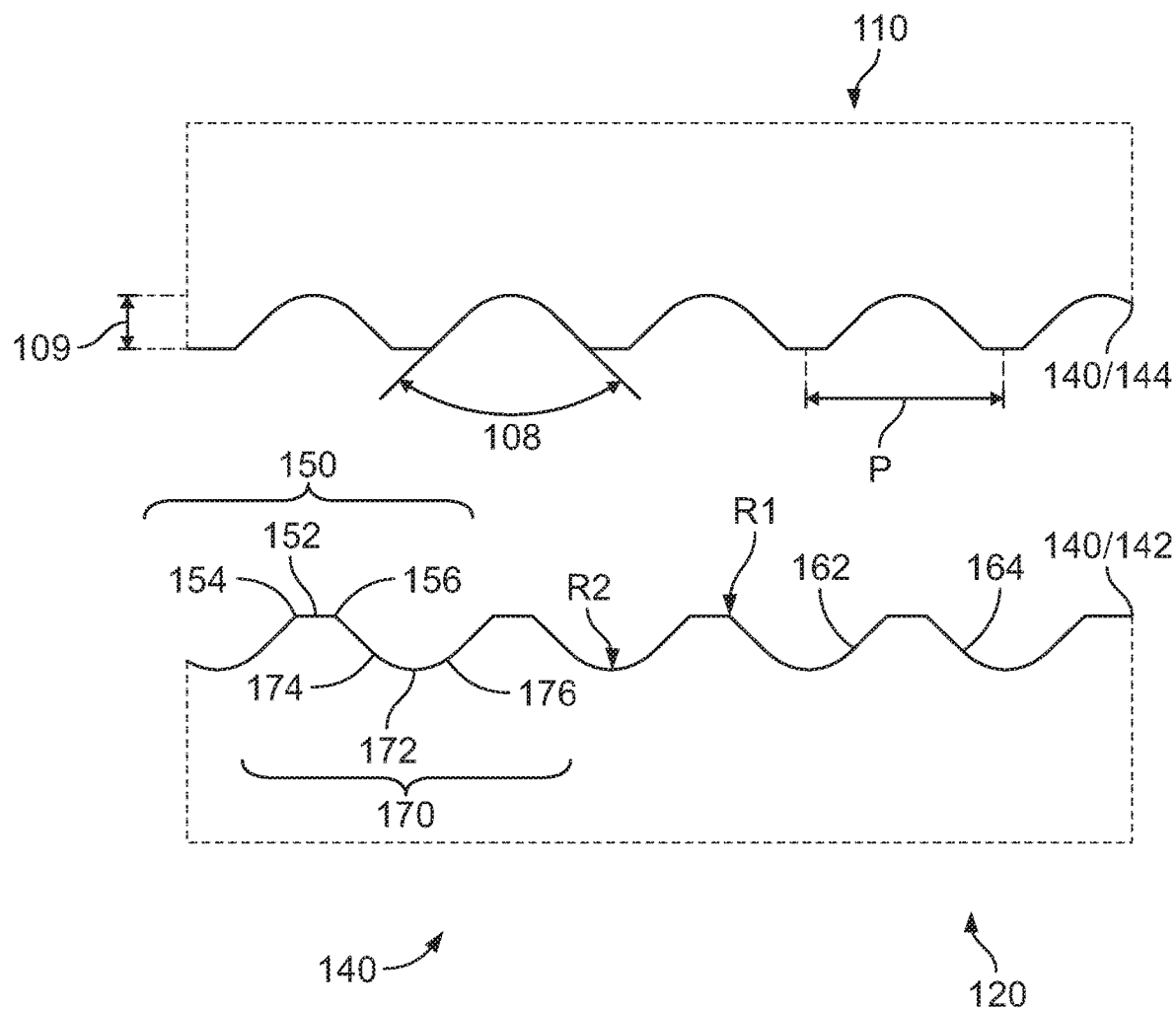
FIG. 2 shows an exploded view of a cross-section of a threaded joint (100) with the male thread (142) and the female thread (144) as they would fit when affixed.

The threaded portion (130) of the shaft (120) follows a thread profile (140) as seen in cross section (See FIG. 1 & FIG. 2). The thread profile (140) comprises a repeating pattern of four components: a crest region (150), a first flank (162), a root region (170) and a second flank (164). The thread profile (140) is symmetrical, that is, the dimensions of the four components do not change throughout the length of the thread profile (See FIG. 1 & FIG. 2).

Figure 3:
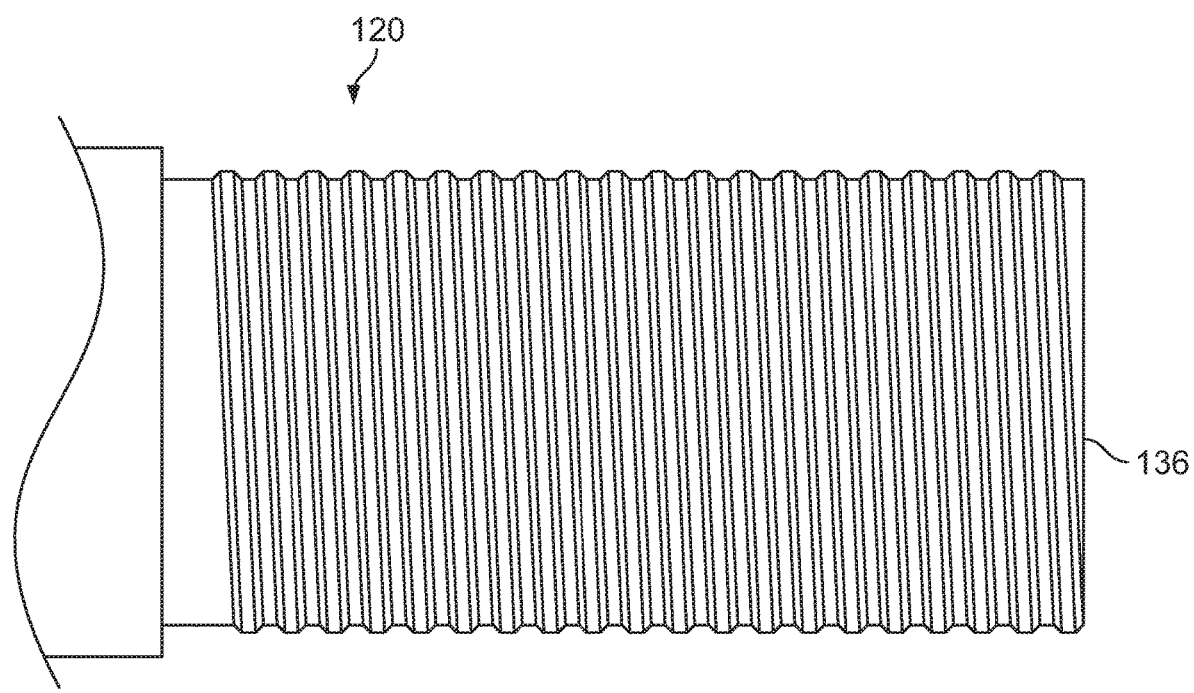
FIG. 3 shows the thread profile (140) of the threaded portion (130) of a shaft (120) from a side view.

FIG. 3 shows the thread profile (140) of the threaded portion (130) of a shaft (120) from a side view.

The threaded portion (118) of the joining shaft (110) follows the same thread profile (140) as the threaded portion (130) of the shaft (120).

The diameter of the threaded portion (130) of the shaft (120) may be less than, greater than, or equal to, the over-all diameter of the shaft (120).

The diameter of the threaded portion (118) of the joining shaft (110) may be less than, greater than, or equal to, the over-all diameter of the joining shaft (110).

The shaft (120) and its threaded portion (130) are concentric to each other, that is, they share a common shaft central axis (102). The joining shaft (110) and its threaded portion (118) are concentric to each other, sharing a common joining shaft central axis (103). When the shaft (120) is affixed to the joining shaft (110), they form a threaded joint (100), and the threaded joint (100), the shaft (120) and the joining shaft (110) share a common joint central axis (104).

The thread profile (140) described in this application is optimized to produce a strong threaded joint (100) when cut into a composite material (See FIG. 2). It has the following features.

The crest region (150) comprises of a crest (152), a first crest transition (154) and a second crest transition (156). The crest (152) extends parallel to the central axis (102) of the shaft (120), forming a flat profile (See FIG. 1 & FIG. 2). The first crest transition (154) joins the crest (152) with the first flank (162). The second crest transition (156) joins the crest (152) with an adjacent second flank (164).

The first crest transition (154) and the second crest transition (156) have a rounded profile, where the radius (R1) of the profile is defined as R1=0.010°. The pitch of the thread (P) is defined as the distance, measured parallel to the central axis (102) of the shaft (120) (See FIG. 1), between corresponding points on the thread profile (See FIG. 2: P). The joining shaft (110) with a similar thread profile (140) would have a similar pitch.

The root region (170) comprises of a root (172), a first root end (174) and a second root end (176). The root (172) joins the first flank (162) at the second root end (176). The root (172) joins the second flank (164) at the first root end (174). The root (172) has a rounded profile, where the radius (R2) on the root (172) is defined as R2=0.060°.

The first flank (162) and the second flank (164) of the thread profile (140) join the root region (170) to the crest region (150). The first flank (162) joins the crest region (150) to the root region (172). The second flank (164) joins the root region (170) to an adjacent crest region (150). The first flank (162) and the second flank (164) have a flat profile and are mirror images of each other. The angle between the first flank (162) and the second flank (164) is called the thread angle (108). The thread angle (108) is to be 90 degrees, plus or minus of around 10°, depending on the variability of the manufacturing process. The thread depth (109) is 0.055" for a 5-TPI thread, plus or minus around 0.010" depending on the variability of the manufacturing process.

Thread TPI (threads per inch) and thread depth (109) varies depending on diameter of the part being threaded. A 5 TPI works great on a 2.5 inch shaft.

A threaded joint (100) is created by affixing the shaft (120) to the joining shaft (110) that has the same thread profile (140) as that of the shaft (120). The thread profile (140) of the joining shaft (110) is also referred as the female thread (144). The thread profile (140) of the shaft (120) is also referred to as the male thread (142). In other words, a shaft (120) with a male thread (142) affixed to a joining shaft (110) with a female thread (144) is referred to as the threaded joint (100) (See FIG. 1).

As seen in FIG. 1 & FIG. 2, when the shaft (120) is affixed to the joining shaft (110), the flat profiles of the crests (152) of the shaft (120) and corresponding rounded profiles of the roots (172) of the joining shaft (110) create a gap to accommodate a substance such as adhesive or lubricant. Similarly, the flat profiles of the crests (152) of the joining shaft (110) and corresponding rounded profiles of the roots (172) of the shaft (120) create a gap to accommodate a substance such as adhesive or lubricant. For example, any type of semi-fluid material that has a consistency between solid and liquid can be used to fill the gap between the rounded profile of the roots (172) and the flat profiles of the crests (152).

In some cases, the male thread (142) and the female thread (144) are joined during assembly, and the assembly is not intended to be disassembled. In this case, adhesive is added to the male thread (142) and the female thread (144) to bond the components together and permanently affix the threaded joint (100) (See FIG. 1).

In some cases, the male thread (142) and the female thread (144) need to be lubricated to improve the affixing between the male thread (142) and the female thread (144). In this case, a lubricant such as grease is added to the male thread (142) and the female thread (144) to improve the affixing (100) between the threaded joint.

CLARIFYING COMMENTS

While the foregoing written description of the invention enables a person having ordinary skill in the art to make and use what is considered presently to be the best mode thereof, those of ordinary skill in the art will understand and appreciate the existence of variations, combinations, and equivalents of the specific embodiment, process, and examples herein. The invention should therefore not be limited by the above described embodiment, process, and examples, but by all embodiments and processes within the scope and spirit of the invention.

SEQUENCE LISTING

Not Applicable

I claim:
1. A shaft, the shaft comprising:
 (a) a thread profile, the thread profile comprising of a repeating pattern of:
  (i) a crest region; the crest region comprising:
   (1) a crest;
   (2) a first crest transition;
   (3) a second crest transition;
  (ii) a first flank;
  (iii) a root region; the root region comprising:
   (1) a root;
   (2) a first root end;
   (3) a second root end;

(iv) a second flank;
(v) where the root joins the first flank at the second root end,
(vi) where the root joins the second flank at the first root end,
(vii) where the first crest transition joins the crest with the first flank,
(viii) where the second crest transition joins the crest with an adjacent second flank,
(ix) where the root has a rounded profile and the radius of the root is 0.060°,
(x) where the crest has a flat profile,
(xi) where the first crest transition and the second crest transition have a rounded profile and the radius of the rounded profile is 0.010°,
(xii) where the thread angle between the first flank and the second flank is 90° plus or minus 10°;
(b) a threaded portion following the thread profile.

2. The shaft as defined in claim 1,
(a) where the shaft is made from composite materials.

3. The shaft as defined in claim 2,
(a) wherein the composite materials of the shaft are epoxy resin and glass fiber.

4. A threaded joint tool comprising:
(a) a thread profile, the thread profile comprising of a repeating pattern of:
  (i) a crest region; the crest region comprising:
    (1) a crest;
    (2) a first crest transition;
    (3) a second crest transition;
  (ii) a first flank;
  (iii) a root region; the root region comprising:
    (1) a root;
    (2) a first root end;
    (3) a second root end;
  (iv) a second flank;
  (v) where the root joins the first flank at the second root end,
  (vi) where the root joins the second flank at the first root end,
  (vii) where the first crest transition joins the crest with the first flank,
  (viii) where the second crest transition joins the crest with an adjacent second flank,
  (ix) where the root has a rounded profile and the radius of the root is 0.060°,
  (x) where the crest has a flat profile,
  (xi) where the first crest transition and the second crest transition have a rounded profile and the radius of the rounded profile is 0.010°,
  (xii) where the thread angle between the first flank and the second flank is 90° plus or minus 10°;
(b) a shaft, the shaft comprising a threaded portion following the thread profile;
(c) a joining shaft, the joining shaft comprising of:
  (i) an exterior surface; and
  (ii) an interior surface, the interior surface comprising a threaded portion following the thread profile;
(d) where the shaft is affixed to the joining shaft.

5. The threaded joint tool as defined in claim 4,
(a) where the shaft and the joining shaft are made from composite materials.

6. The threaded joint tool as defined in claim 5,
(a) wherein the composite materials of the shaft are epoxy resin and glass fiber.

7. The threaded joint tool as defined in claim 4,
(a) where the either the shaft or the joining shaft is made from composite materials and the other is made from non-composite materials.

8. The threaded joint tool as defined in claim 4, the threaded joint tool further comprising:
(a) a gap;
(b) where the gap is created
  (i) between the flat profiles of the crests of the shaft and corresponding rounded profiles of the roots of the joining shaft, and
  (ii) between the flat profiles of the crests of the joining shaft and corresponding rounded profiles of the roots of the shaft,
(c) where the gap accommodates a substance such as adhesive or lubricant.

* * * * *